United States Patent [19]
Ferguson et al.

[11] 3,912,046
[45] Oct. 14, 1975

[54] FLUID DEVICE WITH BACK PRESSURE VALVE ARRANGEMENT

[75] Inventors: George R. Ferguson, Clover, S.C.; David Leonard King, Jr., Charlotte, N.C.

[73] Assignee: Duff-Norton Company, Inc., Charlotte, N.C.

[22] Filed: June 3, 1974

[21] Appl. No.: 475,658

[52] U.S. Cl............ 184/55 A; 137/543.15; 137/605
[51] Int. Cl.² ............................................ F16N 7/30
[58] Field of Search.... 184/55 R, 55 A, 56 R, 56 A, 184/58, 59, 6.26; 124/11 R, 11 A, 13 A; 137/605, 543.15

[56] References Cited
UNITED STATES PATENTS

| | | | |
|---|---|---|---|
| 1,167,593 | 1/1916 | O'Donnell | 184/56 R |
| 2,646,134 | 7/1953 | Wickens | 184/55 A |
| 2,778,619 | 1/1957 | Goodyear | 184/55 A X |
| 2,984,316 | 5/1961 | Malec | 184/55 A |
| 3,115,949 | 12/1963 | Malec | 184/55 A |
| 3,572,469 | 3/1971 | Miller et al. | 184/55 A |

*Primary Examiner*—Richard C. Pinkham
*Assistant Examiner*—Arnold W. Kramer
*Attorney, Agent, or Firm*—Parrott, Bell, Seltzer, Park & Gibson

[57] ABSTRACT

A fluid device which includes a back pressure valve for imposing at least a minimum drop in fluid pressure on fluid flowing through a primary passageway of the device has a mounting arrangement for the back pressure valve which is constructed to make assembly of the device more easy while establishing operative communication with portions of the conduit downstream of the back pressure valve for related auxiliary equipment. The mounting arrangement includes a central stem portion with a longitudinal passageway extending therethrough. Encircling the stem portion is a spool portion. A spoke portion connects the inner wall of the spool portion to the central stem portion. First and second radial passageways extend through the spoke portion between the stem passageway and respective relief portions of the spool. The back pressure valve has a valve member which encircles the stem portion and is biased against the spool portion by a spring. Two secondary passageways in the fluid device intersect the primary passageway. The mounting arrangement is inserted into the primary passageway and seats adjacent the intersection of the secondary passageways with the primary passageway.

9 Claims, 3 Drawing Figures

U.S. Patent  Oct. 14, 1975  3,912,046
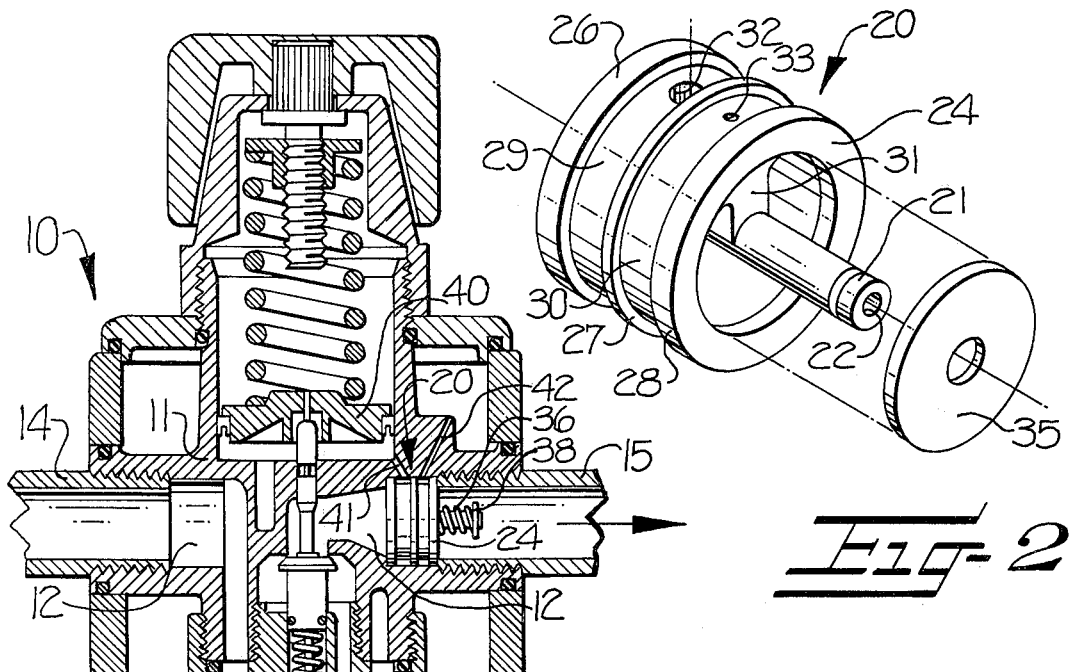
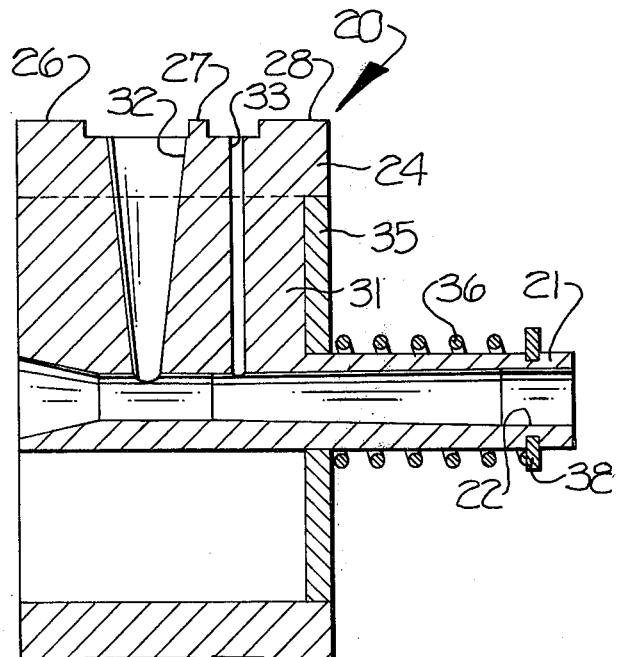
Fig-1
Fig-2
Fig-3

FLUID DEVICE WITH BACK PRESSURE VALVE ARRANGEMENT

This invention is related to an airline device illustrated in U.S. Pat. No. 3,572,469, issued Mar. 13, 1971. The device shown and described in that patent is, in many respects, similar to a number of other devices of the general class which in some manner affect or are affected by the flow of fluids within conduits such as the flow of compressed air through piping systems.

Many devices of the general type briefly referred to hereinabove require multiple passageways through various body elements. Where such multiple passageways are necessary, manufacturing requirements for the devices become more difficult. As a result, there is a greater likelihood that quality of the manufactured product cannot properly be controlled and the costs of manufacture will be unexceptably high.

Having in mind the difficulties encountered with certain prior arrangements, it is an object of the present invention to mount a back pressure valve arrangement within the body of a fluid device by use of a mounting means which also serves the function of defining simplified paths of operative communication between various elements of the device. In realizing this object of the present invention, the manufacturing operations involved in the production of such a device are simplified, and maintenance of necessary high quality of assembly is more easily assured.

A further object of this invention is to aid accommodation of manufacturing practices by combining a plurality of functions necessarily to be performed in a fluid device into a simplified arrangement of components. In realizing this object of the present invention, structure which serves as a mounting means for a back pressure valve additionally defines certain flow passageways necessary for the operation of other elements of a fluid device.

Some of the objects of the invention having been stated, other objects will appear as the description proceeds, when taken in connection with the accompanying drawings, in which FIG. 1 is a elevation view, in section, through a fluid device incorporating the present invention;

FIG. 2 is an exploded perspective view of a mounting arrangement and a portion of a back pressure valve arrangement in accordance with this invention, as incorporated in the device of FIG. 1; and FIG. 3 is an enlarged, elevation view in section of the mounting arrangement and back pressure valve arrangement of FIG. 2.

While the present invention will be described hereinafter with particular reference to the accompanying drawings, which show the present invention in one particular environment, it is to be understood at the outset that this invention is contemplated as having general usefulness in many fluid devices other than the specific device illustrated. Accordingly, the description and accompanying drawings are to be taken only as being directed to the preferred form of the present invention as contemplated at the time the drawings and description have been prepared, with it being understood that the invention is subject to broader use and that the description and drawings are, accordingly, not limiting on the usefulness of this invention.

Referring now more particularly to the drawings, a fluid device is there generally indicated at 10 which includes a body 11 and which is constructed generally in accordance with the drawings and description of U.S. Pat. No. 3,572,469. Interested readers are directed to the description and drawings of that patent in the event that they wish to obtain a more complete understanding of the details of one specific device in which the present invention has utility.

The body 11 has a primary passageway 12 therethrough for defining a portion of a conduit in which pressurized fluid flows. As is generally known, the body 11 is threaded adjacent to inlet and outlet openings for the primary passageway 12, in order to receive conduit members 14, 15 such as piping members or the like. Arranged within the body 11 are two separate forms of means which affect fluid characteristics downstream of the device 10. The first such means is a pressure regulating valve means for controlling the pressure of fluid flowing through the primary passageway 12, while the second such means is a lubricant dispensing means for dispensing a lubricant liquid such as oil into fluid flowing through the primary passageway 12. Such means are described in detail in U.S. Pat. No. 3,572,469 and, accordingly, will not be described in full detail here.

In accordance with an important aspect of this invention, mounting means generally indicated at 20 is disposed within the body 11 for cooperation with other elements of the device. The mounting means 20 has a central stem portion 21 with a longitudinal passageway 22 extending therethrough. As shown in FIG. 3, the stem passageway 22 preferably is configured with a Venturi form, having a restricted neck portion. Encircling the stem portion 21 is a spool portion 24. The spool portion 24 has at least two and preferably three spaced apart sealing rib portions 26, 27, 28 (FIGS. 2 and 3) and corresponding relief portions 29, 30 interposed between pairs of the sealing rib portions 26, 27, 28.

The mounting means 20 also has a spoke portion 31 (shown in perspective in FIG. 2 and in section in FIG. 3) having at least one radial passageway therethrough extending between the stem passageway 22 and the spool portion 24. Preferably, the spoke portion 31 has first and second radial passageways 32, 33 extending therethrough.

As pointed out in U.S. Pat. No. 3,572,469 (see Column 2 beginning at line 40 and Column 3 beginning at line 73) certain fluid characteristic affecting means make desirable the use of a back pressure valve arrangement. The present invention contemplates such a back pressure valve arrangement, provided in the form of a valve member 35 which encircles the stem portion 21. The valve member 35 is biased into sealing engagement with the spool portion 24 by means such as a spring 36 encircling the stem portion 21 and restrained in operative position by a snap ring 38. The function of the back pressure valve member 35, as biased by the spring 36, is the imposition of at least a minimum drop in fluid pressure on fluid flowing through the primary passageway 12.

As clear from U.S. Pat. No. 3,572,469, it is desirable that the pressure regulating valve means and the lubricant dispensing means respond to and affect conditions downstream of the back pressure valve member 35. For that reason, each of those means operatively communicates with a point in the primary passageway 12 downstream of the valve member. In accordance with important features of this invention, such communication is established by at least one secondary passageway through the body 11 which intersects with the primary passageway 12 and by the stem passageway 22; the first and second radial passageways 32, 33; and the relief portions 29, 30.

More particularly, pressures applied to a piston 40 functioning as a part of the pressure regulating valve means include pressures applied through a secondary passageway 41 through the body 11 which, before insertion of the mounting means 20 of this invention, intersects the primary passageway 12. Upon insertion of the mounting means 20, one relief portion 29 is generally aligned with the passageway 41 in the body, while the adjacent rib portions 26, 27 sealingly engage the wall of the primary passageway 12. By this arrangement, operative communication is assured between the secondary passageway 41 and the first radial passageway 32 through the spoke portion 31 to the stem passageway 22. Inasmuch as the stem passageway 22 opens downstream of the back pressure valve member 35, the desired communication is established. It is to be noted that relief portion 29 extends about the entire circumference of the mounting means 20, thereby assuring that such operative communication is established irrespective of the particular orientation at which the mounting means 20 is inserted into the body 11. Thus, high quality of the manufactured product is maintained while facilitating ease of assembly.

In a similar manner, operative communication is established for a lubricant dispensing means through a secondary passageway 42 (FIG. 1), the second relief portion 30, the second radial passageway 33 and the stem passageway 22. As will be understood, the present invention contemplates that either or both of such paths of operative communication may be established and used, depending upon the requirements of a particular fluid device.

Preferably, the present invention contemplates that the body 11 will be so configured that the primary passageway 12 includes a shoulder portion (FIG. 1) spaced in predetermined relationship to the locations at which the secondary passageways 41, 42 intersect the primary passageway 12. By appropriate dimensioning of these locations and the spool portion 24 of mounting means 20, assembly of a device in accordance with this invention may proceed by insertion of the mounting means 20 into the primary passageway 12 and pressing the mounting means into firm engagement with the shoulder.

In the drawings and specification, there has been set forth a preferred embodiment of the invention, and although specific terms are employed, they are used in a generic and descriptive sense only and not for purposes of limitation.

That which is claimed is:

1. A fluid device comprising:

a body having a primary passageway therethrough for defining a portion of a conduit in which pressurized fluid flows and having at least one secondary passageway therein intersecting said primary passageway, mounting means having a central stem portion with a longitudinal passageway therethrough, a spool portion encircling said stem portion, and a spoke portion with at least one radial passageway therethrough extending between said stem passageway and said spool portion, said mounting means being disposed within said primary passageway of said body with the outer periphery of said spool portion engaging the wall of said primary passageway at the location of intersection of said primary passageway and at least one secondary passageway, said stem passageway operatively communicating both directly with said primary passageway and through a radial passageway with a corresponding secondary passageway, a back pressure valve member encircling said stem portion, means for biasing said back pressure valve member toward seating engagement with said spool portion and thereby for imposing at least a minimum drop in fluid pressure on fluid flowing through said primary passageway, and means mounted in said body and operatively communicating with said corresponding secondary passageway for performing one of (a) dispensing lubricant into fluid flowing through said primary passageway and (b) controlling the pressure of fluid flowing through said primary passageway, said stem passageway and said corresponding radial passageway through said mounting means cooperating for establishing operative communication between said last-named means and a point in said primary passageway downstream of said back pressure valve member.

2. A device according to claim 1 wherein said last-named means comprises a pressure regulating valve mounted in said body for controlling the pressure of fluid flowing through said primary passageway.

3. A device according to claim 1 wherein said last-named means comprises a lubricant dispenser for dispensing lubricant into fluid flowing through said primary passageway.

4. A device according to claim 1 wherein said spool portion of said mounting means has at least two spaced apart sealing rib portions for sealingly engaging the wall of said primary passageway and at least one relief portion interposed between two of said sealing rib portions for establishing operative communication between corresponding radial and secondary passageways without regard to the orientation of said spoke portion relative to said secondary passageway.

5. A device according to claim 1 wherein said primary passageway has a right circular cylindrical cross-sectional configuration and said spool portion of said mounting means has at least two spaced apart sealing rib portions each of right circular cylindrical cross-sectional configuration and dimensioned to intimately engage the wall of said primary passageway throughout the periphery of said rib portions.

6. A device according to claim 5 wherein said primary passageway includes an exit portion of predetermined diametrical dimension and a shoulder portion upstream of said exit portion and further wherein said mounting means is inserted into said primary passageway and seatingly engaged with said shoulder.

7. A fluid device comprising:

a body having a primary passageway therethrough for defining a portion of a conduit in which pressurized fluid flows and having a secondary passageway therein intersecting said primary passageway, mounting means having a central stem portion with a longitudinal passageway therethrough, a spool portion encircling said stem portion, and a spoke portion with a radial passageway therethrough extending between said stem passageway and said spool portion, said mounting means being disposed within said primary passageway of said body with the outer periphery of said spool portion sealingly engaging the wall of said primary passageway adjacent the location of intersection of said primary and secondary passageways, said stem passageway operatively communicating both directly with said primary passageway and through said radial passageway with said secondary passageway, a back pressure valve member encircling said stem portion, means for biasing said back pressure valve member toward seating engagement with said spool portion and thereby for imposing at least a minimum drop in fluid pressure on fluid flowing through said primary passageway, and means for dispensing a lubricant into said secondary passageway, said stem passageway and said radial passageway through said mounting means cooperating for establishing operative communication between said lubricant dispensing means and a point in said primary passageway downstream of said back pressure valve member.

8. A fluid device comprising:

a body having a primary passageway therethrough for defining a portion of a conduit in which pressurized fluid flows and having a secondary passageway therein intersecting said primary passageway, mounting means having a central stem portion with a longitudinal passageway therethrough, a spool portion encircling said stem portion, and a spoke portion with a radial passageway therethrough extending between said stem passageway and said spool portion, said mounting means being disposed within said primary passageway of said body with the outer periphery of said spool portion sealingly engaging the wall of said primary passageway adjacent the location of intersection of said primary and secondary passageways, said stem passageway operatively communicating both directly with said primary passageway and through said radial passageway with said secondary passageway, a back pressure valve member encircling said stem portion, means for biasing said back pressure valve member toward seating engagement with said spool portion and thereby for imposing at least a minimum drop in fluid pressure on fluid flowing through said primary passageway, and pressure regulating valve means mounted in said body for regulating the pressure of fluid flowing through said primary passageway and operatively communicating with said secondary passageway for responding to fluid pressure characteristics downstream of said back pressure valve member, said stem passageway and said radial passageway through said mounting means cooperating for establishing operative communication between said pressure regulating valve means and a point in said primary passageway downstream of said back pressure valve member.

9. A fluid device comprising:

a body having a primary passageway therethrough for defining a portion of the conduit in which pressurized fluid flows and having two secondary passageways therein intersecting said primary passageway, mounting means having a central stem portion with a longitudinal passageway therethrough, a spool portion encircling said stem portion, and a spoke portion with two radial passageways therethrough extending between said stem passageway and said spool portion, said mounting means being disposed within said primary passageway of said body with the outer periphery of said spool portion sealingly engaging the wall of said primary passageway adjacent the location of intersection of said secondary passageways with said primary passageway, said stem passageway operatively communicating both directly with said primary passageway and with said secondary passageways through corresponding ones of said radial passageways, a back pressure valve member encircling said stem portion, means for biasing said back pressure valve member toward seating engagement with said spool portion and thereby for imposing at least a minimum drop in fluid pressure on fluid flowing through said primary passageway, pressure regulating valve means mounted within said body for regulating the pressure of fluid flowing through said primary passageway and operatively communicating with one of said secondary passageways for responding to fluid pressure downstream of said back pressure valve member, and lubricant dispensing means mounted within said body and operatively communicating with the other of said secondary passageways for supplying lubricant to fluid flowing through said primary passageway, said stem passageway and said radial passageways through said mounting means cooperating for establishing operative communication between corresponding ones of the pressure regulating means and the lubricant dispensing means and points in said primary passageway downstream of said back pressure valve member.

* * * * *